United States Patent
Kato et al.

(10) Patent No.: US 8,804,298 B2
(45) Date of Patent: Aug. 12, 2014

(54) GAS INSULATED BUS AND PARTICLE REMOVAL METHOD FOR GAS INSULATED BUS

(75) Inventors: Tatsuro Kato, Hitachi (JP); Toshiaki Rokunohe, Hitachi (JP); Hisashi Urasaki, Hitachi (JP); Ryoichi Shinohara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 14 days.

(21) Appl. No.: 13/462,974

(22) Filed: May 3, 2012

(65) Prior Publication Data

US 2012/0281332 A1    Nov. 8, 2012

(30) Foreign Application Priority Data

May 6, 2011  (JP) ................ 2011-103531

(51) Int. Cl.
*H02H 1/00*        (2006.01)
(52) U.S. Cl.
USPC .......................................... 361/226; 361/117
(58) Field of Classification Search
USPC ......................................... 361/117–118, 226
See application file for complete search history.

(56) References Cited

U.S. PATENT DOCUMENTS

| | | | | |
|---|---|---|---|---|
| 3,814,830 A | * | 6/1974 | Cronin et al. | 174/22 C |
| 3,911,937 A | * | 10/1975 | Sletten et al. | 134/1 |
| 4,330,682 A | | 5/1982 | Dale et al. | |

FOREIGN PATENT DOCUMENTS

| | | |
|---|---|---|
| JP | 56-104258 A | 8/1981 |
| JP | 57-110013 A | 7/1982 |
| JP | 60-167615 A | 8/1985 |
| JP | 61-39809 A | 2/1986 |
| JP | 6-86432 A | 3/1994 |
| JP | 11-262144 A | 9/1999 |
| JP | 2002-10417 A | 1/2002 |
| JP | 2007-325415 A | 12/2007 |

OTHER PUBLICATIONS

Japanese Office Action dated Jan. 7, 2014 (Three (3) pages).

* cited by examiner

*Primary Examiner* — Danny Nguyen
(74) *Attorney, Agent, or Firm* — Crowell & Moring LLP

(57) ABSTRACT

The present invention is provided to satisfy insulation and conductivity performance requirements, to reduce the size of a gas insulated bus, and also to make conditioning for a particle more reliable. In a gas insulated bus having a conductor supported in a cylindrical metal container via an insulator, insulating gas being contained in the metal container, the metal container has an expanded diameter part formed over a given range in an area of the metal container in which the insulator is positioned and a reduced diameter part formed over the entire area of the metal container except for the expanded diameter part. Thus, when the temperature of the insulator increases during conduction, heat from the insulator is transferred to the metal container via a large space in the expanded diameter part and released to the air through a large outer surface of the expanded diameter part of the metal container.

3 Claims, 9 Drawing Sheets

GAS INSULATED BUS AND PARTICLE REMOVAL METHOD FOR GAS INSULATED BUS

BACKGROUND OF THE INVENTION

1. Field of the Invention

The present invention relates to a gas insulated bus or a gas insulated line (hereinafter collectively referred to as a gas insulated bus when necessary) and a method for removing a particle from the inside of the gas insulated bus.

2. Description of the Related Art

A gas insulated bus (GIB) or a gas insulated line is a component device of a gas insulated substation or a gas insulated transmission line facility and is configured such that a conductor (high-voltage conductor) supported by an insulator is coaxially accommodated in a cylindrical grounded metal container in which insulating gas (typically $SF_6$ gas) is contained. Furthermore, in general, in use, a plurality of gas insulated buses are coupled together in series or coupled to a gas insulated switchgear or a gas insulated transformer, as needed, and thus flanges for coupling are provided at the respective opposite ends of each of the gas insulated buses. Additionally, an insulating spacer with any of various shapes is used as the insulator that supports the high-voltage conductor. For example, a connection conductor to which the high-voltage conductor is connected is allowed to penetrate the center of an insulating spacer formed of an epoxy resin or the like and shaped like a disk or a cone, and the resulting structure is installed in a cylindrical metal container. Alternatively, a columnar post-type insulating spacer or the like is appropriately used as needed.

Such a gas insulated bus has been demanded to satisfy insulation and conductivity performance requirements but also to be smaller in size and more reliable. Here, the insulation performance requirement is the capability of withstanding a voltage that is equal to or higher than, for example, a specified breakdown voltage. However, the insulation performance is significantly degraded when a conductive particle such as metal is present inside the metal container. Thus, strict quality control is performed during manufacturing steps and assembly steps so as to prevent a particle from entering the metal container. On the other hand, the conductivity performance includes satisfying a current capacity requirement and a requirement for an allowable increase in the temperature of the insulating spacer part according to, for example, the JEC standard.

Thus, Reference 1 reports the results of analysis of distribution of an electric field strength near the conical insulating spacer in order to allow a reduction in the size of the gas insulated bus. The Reference 1 reports that the electric field strength in the metal container of a conical outer surface side of the insulating spacer is greater than that in the metal container of a conical inner surface side of the insulating spacer and that the electric field strength in the metal container of the conical outer surface side of the insulating spacer decreases with increasing distance from the insulating spacer. Thus, the Reference 1 proposes that a diameter of the metal container on the conical inner surface side of the insulating spacer be defined to be smaller than that of the metal container on the conical outer surface side of the insulating spacer and that the diameter of the metal container on the conical outer surface side is defined to be small by being defined from a position located at a given distance from the insulating spacer.

On the other hand, a method for conditioning for a particle has been proposed in which a particle trap with a low electric field strength is formed in the metal container and in which before operation, a voltage lower than an operating voltage is applied to a high-voltage conductor in a stepwise fashion to allow a particle to float and accumulate in the particle trap. In particular, Reference 2 proposes that conditioning for a particle be carried out by reducing the insulation performance of insulating gas in order to facilitate motion of the particle.

LIST OF REFERENCES

Reference 1: JP-A-6-86432
Reference 2: JP-A-2007-325415

SUMMARY OF THE INVENTION

However, a method for reducing the size of a gas insulated bus according to the Reference 1 fails to take into account a reduction in the size of the gas insulated bus with satisfying the insulation and conductivity performance requirements. That is, the method fails to take into account suppression of an increase in the temperature of the insulating spacer part which is to be carried out to satisfy the conductivity performance requirement when the diameter of the metal container of the gas insulated bus is reduced. For example, in connection with an increase in temperature during conduction, the JEC standard and the like specify that the temperature of the insulating spacer part is at most 105° C. Thus, an excessive reduction in the diameter of the metal container disadvantageously increases the temperature during conduction.

Furthermore, the method for conditioning for a particle according to the Reference 2 fails to take into account a reliable particle trap that does not affect the insulation performance even if a particle having moved to the particle trap, which has a low electric field, is left uncontrolled. Additionally, the Reference 2 fails to take into account the case of a gas insulated bus having a long bus length. That is, the method fails to take into account a measure taken if a particle is present inside a gas insulated bus having a long bus length, to immediately move the particle into the particle trap, which has a low electric field, thus reducing operation time for conditioning for the particle.

A first object of the present invention is to satisfy the insulation and conductivity performance requirements and to reduce the size of the gas insulated bus.

Furthermore, in addition to the first object, a second object of the present invention is to make the conditioning for a particle more reliable.

Moreover, in addition to the first and second objects, a third object of the present invention is to reduce the operation time for conditioning for a particle.

A first aspect of the present invention for accomplishing the first object provides a gas insulated bus having a conductor supported in a cylindrical metal container via an insulator, insulating gas being contained in the cylindrical metal container, characterized in that the metal container has an expanded diameter part formed over a given range in an area of the metal container in which the insulator is positioned and a reduced diameter part formed in an entire area of the metal container except for the expanded diameter part.

As described above, the expanded diameter part is formed in the area with the insulator positioned therein. Thus, even when the temperature of the insulator increases during conduction, heat from the insulator is transferred to the metal container via a large space in the expanded diameter part and then released to the air through the large outer surface of the expanded diameter part of the metal container. This enables an increase in the temperature of the insulating material to be limited to a specified value or smaller. Furthermore, an electric field in the expanded diameter part of the metal container can be reduced to allow the expanded diameter part to function as a particle trap for conditioning for a particle.

In the above-described case, a surface of the conductor corresponding to a position opposite to at least the reduced diameter part of the metal container is preferably covered with an insulation coating. This enables the insulation performance of the reduced diameter part to be improved, allowing a further reduction in the diameter of the reduced diameter part and thus in the size of the gas insulated bus. As a result, the weight and cost of the gas insulated bus can be reduced.

Furthermore, a second aspect of the present invention for accomplishing the second object is that in any of the above-described cases, an inner surface of at least the expanded diameter part of the metal container is preferably covered with an insulation coating. This enables a reduction in the electric field strength of a vicinity of the inner surface of the expanded diameter part of the metal container. Thus, a particle trapped in the expanded diameter part as a result of conditioning for a particle can be restrained from refloating. Even when a normal operating voltage is applied to the high-voltage conductor, the particle reliably remains in the expanded diameter part, which is a particle trap. Therefore, the conditioning for a particle can be made more reliable. As a result, a reliable particle trap can be provided which does not affect the insulation performance even if a particle having moved to the expanded diameter part is left uncontrolled.

Additionally, not only the inner surface of the expanded diameter part of the metal container but also the inner surface of the reduced diameter part of the metal container can be covered with an insulation coating. This enables the insulation performance of the reduced diameter part to be further improved, allowing a further reduction in the diameter of the reduced diameter part and in the size of the gas insulated bus.

In addition, in any of the above-described cases, an opening with a releasable cover can be formed in the expanded diameter part of the metal container at least on one side of the insulator. This allows a particle trapped in the expanded diameter part to be taken out when necessary instead of being left uncontrolled.

Furthermore, in order to accomplish the third object, the present invention provides a particle removal method for removing a particle having entered the metal container of any of the above-described gas insulated buses, characterized by including coupling a metal container for applied voltage comprising a conductor for applied voltage for applying a voltage to the conductor of the gas insulated bus, to a flange on one end of the metal container of the gas insulated bus formed at respective opposite ends of the metal container and which is coupled to a metal container of another gas insulated bus, and coupling a testing seal container to a flange on the other end, installing the metal container at least in an inclined manner and containing insulating gas in the respective containers, and applying a voltage to the conductor of the gas insulated bus in a stepwise fashion via the metal container for applied voltage to allow a particle present in the metal container of the gas insulated bus to float and accumulate in the expanded diameter part located at a low position of the inclined metal container.

According to the particle removal method according to the present invention, the metal container is installed at least in an inclined manner for conditioning for a particle. Thus, when a particle floated by an electric field falls down onto the inner surface of the metal container, gravity causes the particle to fall down onto the inner surface of a lower part of the metal container. That is, the position of the particle that repeatedly floats and falls moves to the lower expanded diameter part of the metal container. This enables an increase in the traveling speed of the particle. As a result, the operation time for conditioning for a particle can be reduced. The particle removal method according to the present invention allows a plurality of gas insulated buses to be subjected to conditioning for a particle at a time.

The gas insulated bus according to the first aspect of the present invention satisfies the insulation and conductivity performance requirements and can also have a reduced size. In addition, the gas insulated bus according to the second aspect of the present invention allows the conditioning for a particle to be made more reliable. Moreover, the particle removal method enables a reduction in the operation time for conditioning for a particle.

DETAILED DESCRIPTION OF THE PREFERRED EMBODIMENTS

A gas insulated bus according to the present invention will be described based on illustrated embodiments.

Embodiment 1

Figure 1:
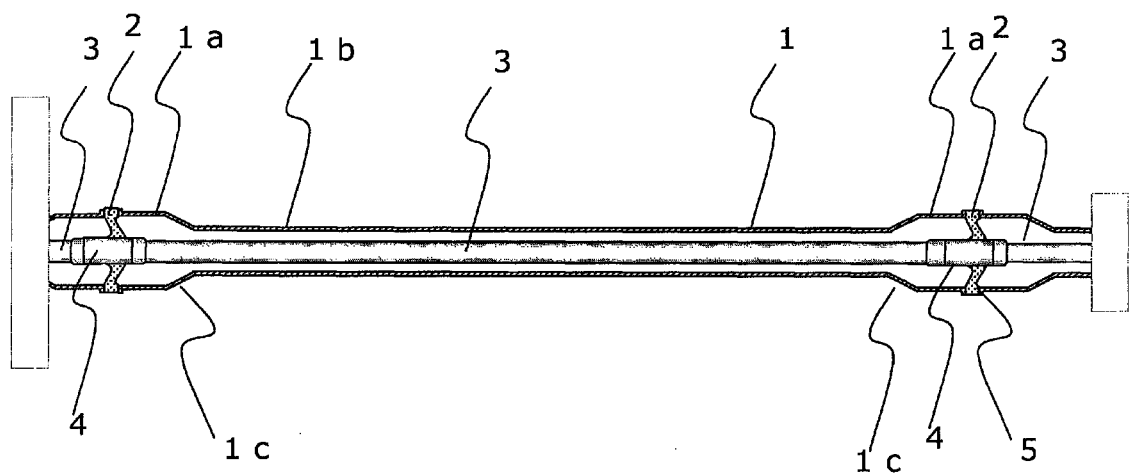
FIG. 1 is a cross-sectional view showing a configuration of a gas insulated bus according to an embodiment of the present invention.

The present invention is applicable to gas insulated lines without any change. However, the present invention will be described based on a cross-sectional view of an embodiment of a gas insulated bus shown in FIG. 1. As shown in FIG. 1, the gas insulated bus is compactly configured to have a high-voltage conductor 3 supported, via insulating spacers 2 serving as an insulator, in a cylindrical metal container 1 in which a high-pressure $SF_6$ gas is contained. Each of the insulating spacers 2 is formed of an epoxy resin, which has a high dielectric strength, and is shaped like a cone. A connection conductor 4 to which the high-voltage conductor 3 is connected is provided so as to penetrate a center of the insulating spacer 2. Furthermore, in use, the metal container 1 is grounded, though this is not shown in the drawings.

In the illustrated example, flanges 5 are provided at the respective opposite ends of the cylindrical metal container 1. The flanges 5 provided at the ends of the adjacent metal containers 1 sandwich a peripheral part of the insulating spacer 2 between the flanges 5, which are coupled together via bolts (not shown in the drawings). The adjacent metal containers 1 are not limited to gas insulated buses. For example, each of the metal containers 1 may accommodate the high-voltage conductor 3 connected to a gas insulated switchgear or a gas insulated transformer.

Figure 2:
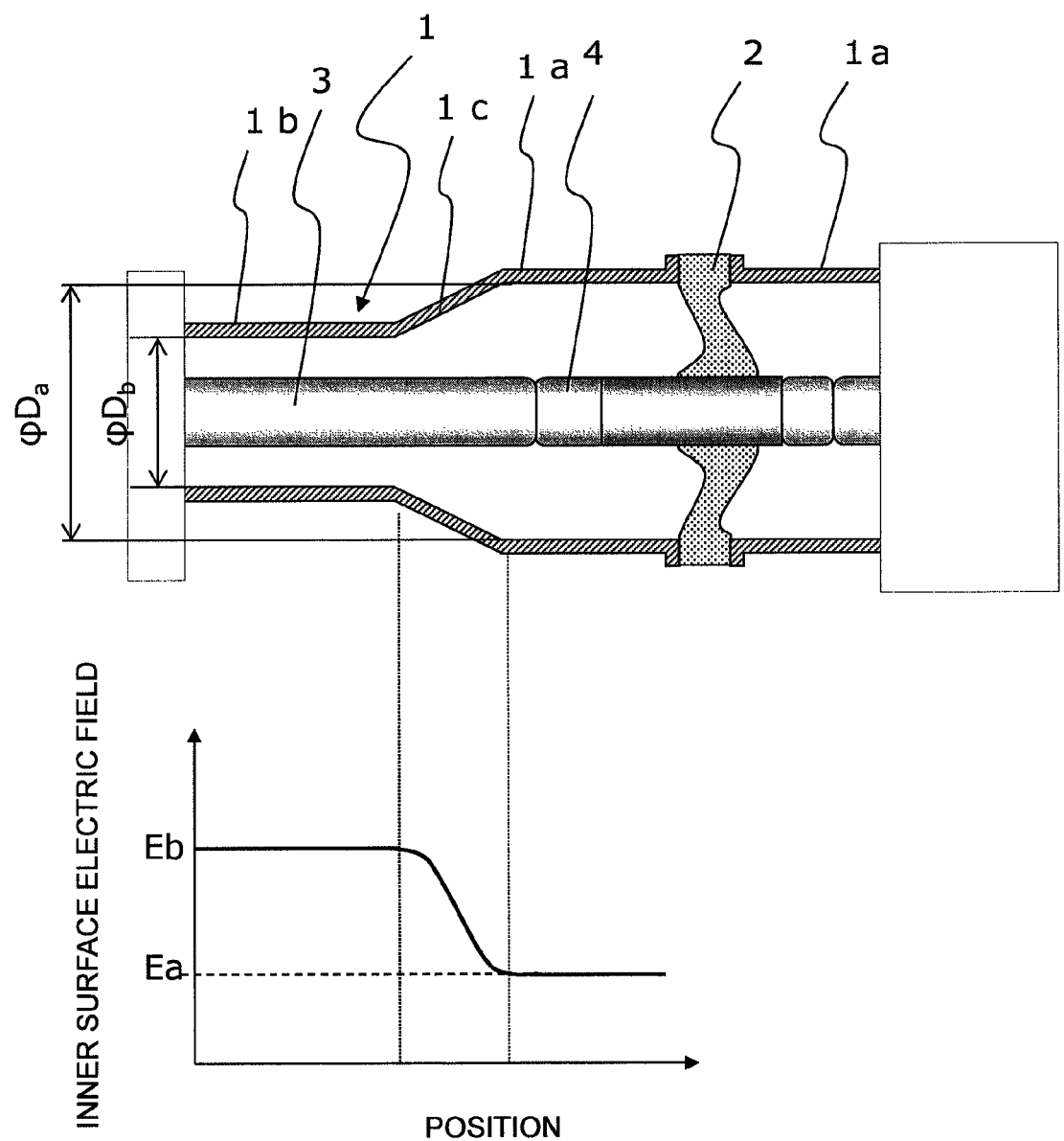
FIG. 2 is a cross-sectional view of a configuration of essential components of the gas insulated bus according to the embodiment shown in FIG. 1 and a diagram showing the electric field strength of a vicinity of an inner surface of a metal container.

The present embodiment is characterized in that a diameter of the metal container 1 has an expanded diameter part 1a formed to be large over a given range of an area in which the insulating spacer 2 is positioned, a reduced diameter part 1b formed over the entire area of the metal container 1 except for the expanded diameter part 1a, and a transition part 1c located at a junction between the expanded diameter part 1a and the reduced diameter part 1b and having a gradually reduced (or increased) diameter. That is, a gas gap part is formed between the inner surface of the reduced diameter part 1b, located away from the insulating spacer 2, and the high-voltage conductor 3. FIG. 2 shows an enlarged view of a vicinity of the insulating spacer 2. In FIG. 2, when an inner diameter of the expanded diameter part 1a is denoted as φDa and an inner diameter of the reduced diameter part 1b is denoted as φDb, the relationship φDa>φDb is established.

Therefore, according to the present embodiment, since the expanded diameter part 1a is formed over the given range on the opposite sides of the insulating spacer 2, even if the temperature of the insulating spacer 2 increases during conduction, heat from the insulating spacer 2 is transferred to the metal container 1 via the large space in the expanded diameter part 1a and released to the air through the large outer surface of the expanded diameter part 1a of the metal container 1. As a result, the appropriate design of the diameter φDa of the expanded diameter part 1a enables an increase in the temperature of the insulating spacer 2 to be limited to a specified value or smaller. On the other hand, the diameter φDb of the reduced diameter part 1b can be designed to be small as long as the breakdown voltage requirement is met, thus allowing the size of the gas insulated bus to be reduced.

Now, the electric field strength of the vicinity of the inner surface of each of the expanded diameter part 1a and the reduced diameter part 1b will be discussed. The electric field strength of the vicinity of the inner surface of the expanded diameter part 1a is denoted as Ea. The electric field strength of the vicinity of the inner surface of the reduced diameter part 1b is denoted as Eb. Furthermore, the inner diameter of the metal container 1 is denoted as D, and the outer diameter of the high-voltage conductor 3 is denoted as d. If the metal container 1 and the high-voltage conductor 3 have coaxial structures, when a voltage V is applied to the high-voltage conductor 3, the electric field strength E of the vicinity of the inner surface of the metal container 1 is expressed by Expression (1) based on the geometric structures.

$$E = V/\{(D/2) \times \log(D/d)\} \quad (1)$$

Thus, the electric field strength Ea of the vicinity of the inner surface of the expanded diameter part 1a and the electric field strength Eb of the vicinity of the inner surface of the reduced diameter part 1b are in such a relationship as shown in FIG. 2. The electric field strength of the vicinity of the inner surface of the transition part 1c is intermediate between the electric field strengths Ea and Eb.

On the other hand, if the metal container 1 and the high-voltage conductor 3 have coaxial structures, an electric field strength $E_L$ at which a conductive particle such as metal which enters the metal conductor starts to rise up or float is expressed by Expression (2).

$$E_L = \sqrt{(\rho g r / 1.43 \in o)} \quad (2)$$

In Expression (2), ρ denotes a density of a particle, g denotes a gravitational acceleration, r denotes a radius of the particle, and ∈o denotes a dielectric constant of insulating gas.

If the particle is moved to the low electric field part by conditioning for a particle, the voltage is increased in a stepwise fashion from a value smaller than an operating voltage up to a value larger than the operating voltage to move the metal particle to the low electric field part. Thus, when the electric field strength Eb of the vicinity of the inner surface of the reduced diameter part 1b is higher than the electric field strength $E_L$, that is, the condition Eb>$E_L$ is satisfied, the particle moves. In contrast, when the electric field strength Ea of the vicinity of the inner surface of the expanded diameter part 1a is lower than the electric field strength $E_L$, that is, Ea<$E_L$, the electric field strength Ea is equal to or lower than the electric field strength at which the particle starts to rise up or float and the particle is prevented from moving.

Thus, when the gas insulated bus is configured to meet the condition Ea<$E_L$<Eb at the operating voltage of the gas insulated bus, the conditioning for a particle allows the particle to float from the reduced diameter part 1b, which has an electric field strength higher than $E_L$, and to move to the expanded diameter part 1a with the electric field strength Ea, which is lower than the electric field strength $E_L$. The particle thus remains in the low electric field part near the insulating spacer 2. Thus, a reliable gas insulated bus can be provided. That is, the present embodiment enables a reduction in the electric field of the expanded diameter part 1a of the metal container 1, allowing the expanded diameter part 1a to function as a particle trap for the conditioning for a particle.

Figure 3:
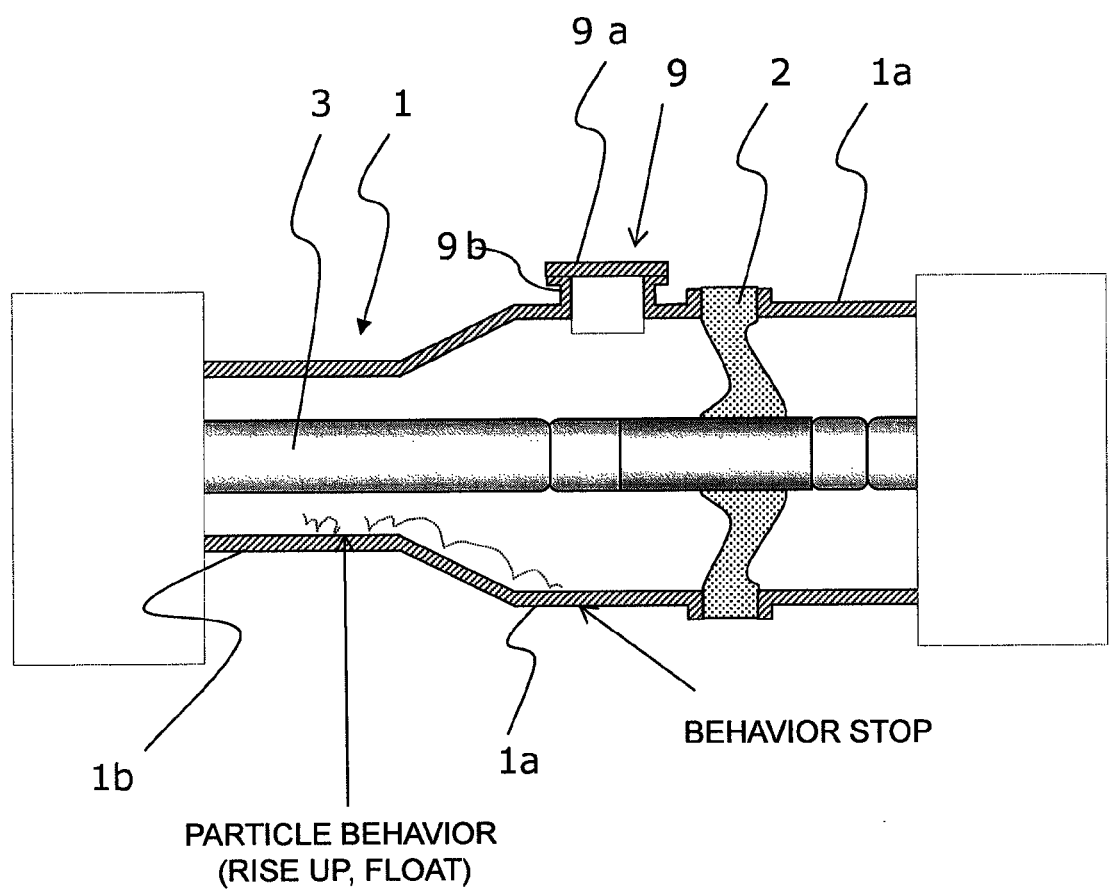
FIG. 3 is a diagram illustrating an example of behavior of a particle during conditioning for a particle in the gas insulated bus according to the embodiment shown in FIG. 1.

This will be described with reference to FIG. 3. As shown in FIG. 3, when the electric field Eb in the vicinity of the inner surface of the reduced diameter part 1b, which is higher than $E_L$, acts on a conductive particle such as metal, the particle, which is long, rises up and floats. The particle repeats a motion of jumping up from the inner surface, located in the lower part of the gravitational field. Thus, the particle moves from the reduced diameter part 1b with a high electric field to the expanded diameter part 1a with a low electric field, where the particle stops the floating motion. That is, with an operating voltage involving a random rebound direction, the particle, while motionless in the expanded diameter part 1a with a low electric field, is unlikely to refloat. Thus, the conditioning for a particle is more reliable.

Furthermore, a hand hole 9 composed of an opening 9b with a cover 9a that can be installed on and released from the expanded diameter part 1a is formed as shown in FIG. 3. Then, if the particle having moved to and stopped in the expanded diameter part 1a remains therein, then after the conditioning for a particle, the hand hole 9 is opened to allow the trapped particle to be removed. That is, the gas insulated bus may have a long coaxial structure that is at least several meters in length, and thus observing, inspecting, and cleaning the inside of the gas insulated bus are difficult. In this regard, according to the present embodiment, particles may be collected in the expanded diameter part 1a by the conditioning for a particle, and the expanded diameter part 1a may be exclusively inspected and cleaned. Then, a gas insulated bus can be provided which is reliable in terms of insulation.

Embodiment 2

Figure 4:
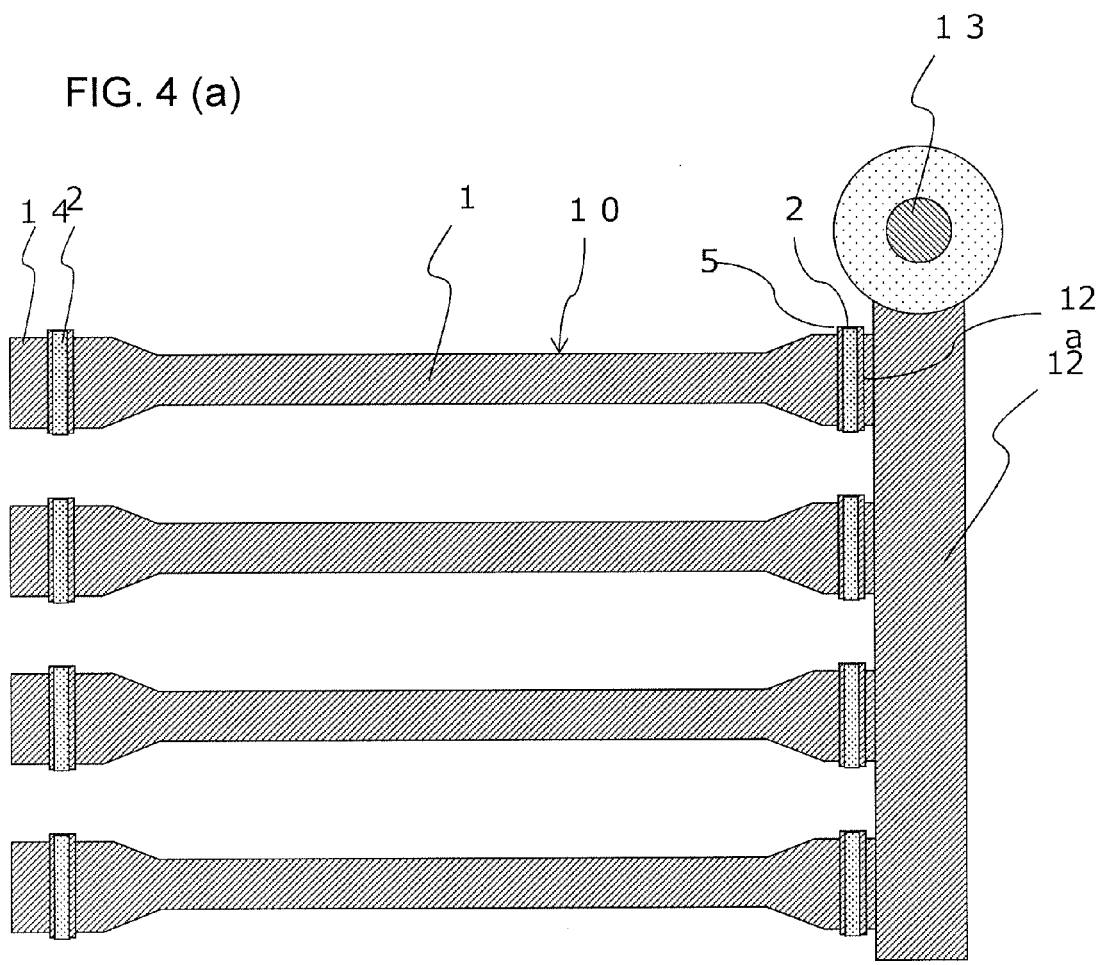
FIG. 4 is a schematic diagram of a configuration of an embodiment of a device for use in removing a particle from the gas insulated bus according to the embodiment shown in FIG. 1.
Figure 4:
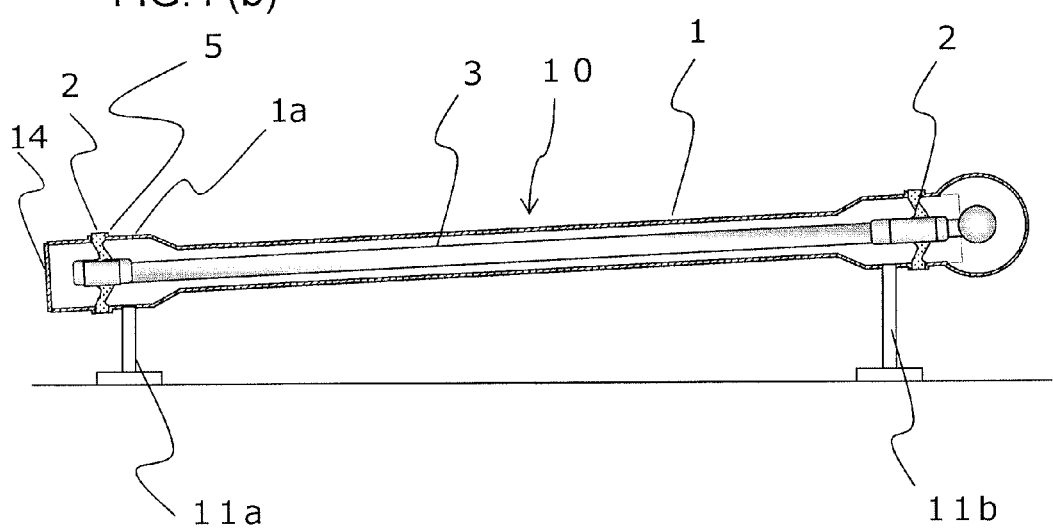

FIG. 4 shows a configuration of a device for conditioning for a particle according to an embodiment which is preferable for removing a particle by carrying out conditioning for a particle on the gas insulated bus shown in the embodiment in FIG. 1. FIG. 4(a) is a plan view of the device, and FIG. 4(b) is a cross-sectional view of the device as seen from a side of the device. FIG. 4 shows the device that simultaneously carries out conditioning for a particle on a plurality of (in the illustrated example, four) gas insulated buses 10. The present embodiment differs from the conditioning for a particle described with reference to FIGS. 1 to 3 in that as shown in FIG. 4(b), the opposite ends of the gas insulated bus 10 are installed on cradles 11a and 11b, which are different in height so as to incline the entire gas insulated bus for the conditioning for a particle.

That is, the conditioning for a particle described with reference to FIGS. 1 to 3 assumes that the gas insulated bus 10 is held horizontally. However, a levitation force exerted on a particle by an electric field acts mainly in a radial direction of a reduced diameter part 1b and fails to move the gas insulated bus 10 in a horizontal direction (axial direction). Thus, in the present embodiment, the gas insulated bus 10 is installed so as to incline from the horizontal direction, thus allowing the gravity to act on the particle as an external force. As a result, the particle is efficiently moved in the inclining direction, that is, to the expanded diameter part 1a located at an end of the gas insulated bus 10 and is installed lower.

That is, as shown in FIG. 4, a plurality of (in the illustrated example, four) gas insulated buses 10 are installed side by side on the cradles 11a and 11b. A flange 12a of a metal container for applied voltage 12 is coupled via the insulating spacer 2 to a flange 5 of an expanded diameter part 1a located at a higher end of each of the gas insulated buses 10; the metal container for applied voltage 12 has a conductor through which a voltage is applied to a high-voltage conductor 3 in the gas insulated bus 10. The conductor of the metal container 12 for applied voltage is supplied, via a bushing for applied voltage 13, with a high voltage for conditioning for a particle provided by a high-voltage power source (not shown in the drawings). On the other hand, a flange 5 of a seal cap 14 is coupled via the insulating spacer 2 to a flange 5 of an expanded diameter part 1a located at a lower end of the gas insulated bus 10.

The device for conditioning for a particle configured as described above is used to apply gradually a voltage lower than the operating voltage to the high-voltage conductor 3 of the gas insulated bus 10 via the bushing 13 for applied voltage and the metal container 12 for applied voltage. Then, a particle is floated every time an electric field of a strength higher than the electric field strength $E_L$ shown in Expression (2) described above and at which the particle starts to rise up or float is applied to the reduced diameter part 1b. Then, the particle floated by the electric field falls onto the inner surface of the reduced diameter part 1b, gravity causes the particle to fall down onto a lower part of the inner surface of the reduced diameter part 1b. The particle repeats such motion, and the position of the particle moves to the expanded diameter part 1a, located at a low position of the gas insulated bus 10. That is, the traveling speed of the particle can be increased by an amount corresponding to the action of the gravity, thus reducing the operation time for conditioning for a particle.

Embodiment 3

Figure 5:
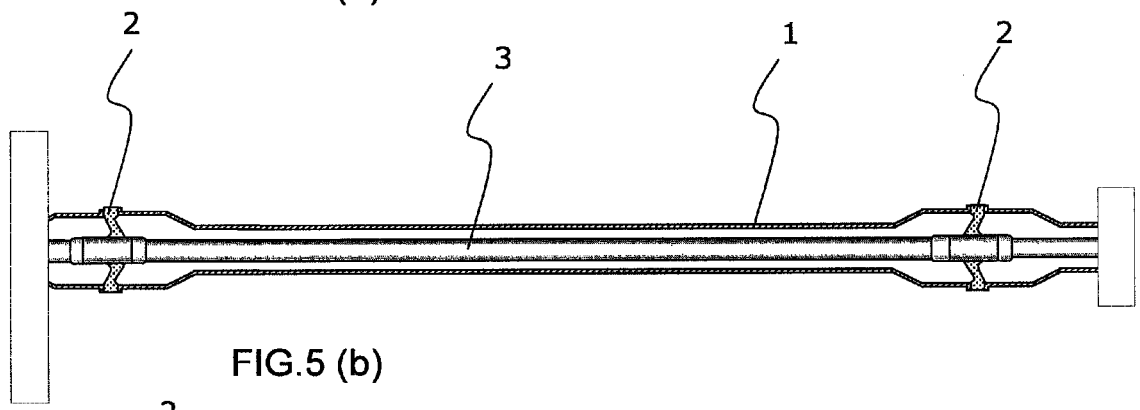
FIG. 5 is a cross-sectional diagram showing a configuration of a variation of the gas insulated bus according to the embodiment shown in FIG. 1.
Figure 5:
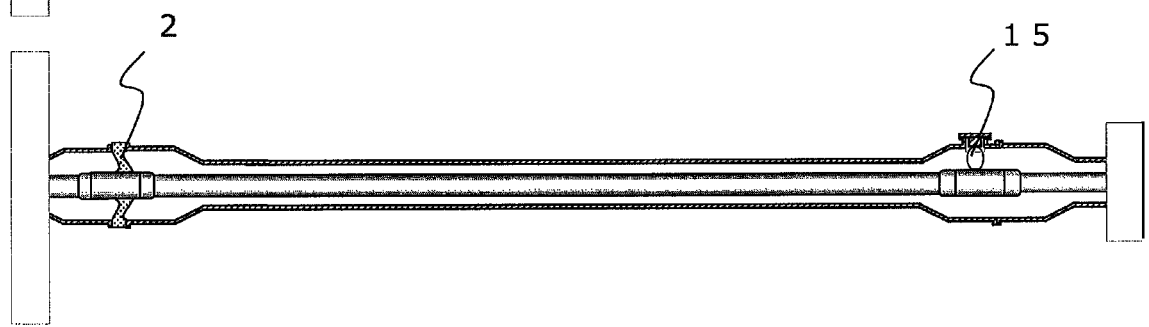
Figure 5:
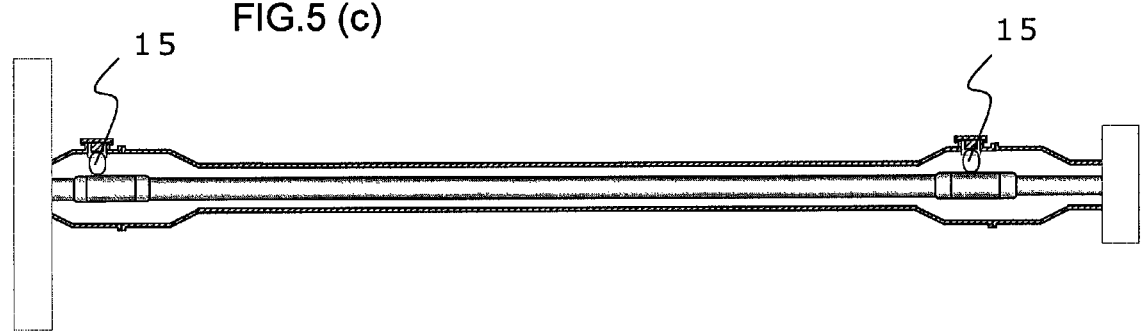

In the embodiment in FIG. 1, the example is shown in which the cone-shaped insulating spacer is used at each of the opposite ends of the gas insulated bus. However, the present invention is not limited to this. The gas insulated bus may be configured using insulating spacers 15 one or both of which are shaped like a post. FIGS. 5(a) to 5(c) show gas insulated buses configured using such insulating spacers in various forms. The conical insulating spacer 2 has not only a function to support the high-voltage conductor 3 but also a function to keep the inside of the adjacent metal container 1 gas tight. In contrast, the post-shaped insulating spacer 15 has the function to support the high-voltage conductor 3 but not the function to keep the inside of the adjacent metal container 1 gas tight. Gas insulated buses are often coupled together for power transmission over a very long distance, and thus various shapes and arrangements of insulating spacers are used. If the gas insulated bus according to the present invention is used, then during conditioning for a particle, a particle is moved to and trapped in the expanded diameter part 1a, the low electric field part, located near the insulating spacer regardless of whether the insulating spacer is shaped like a cone or a post. Thus, during operation, no particle is present inside the gas insulated bus. Therefore, the present invention can improve the reliability against particles.

Embodiment 4

Figure 6:
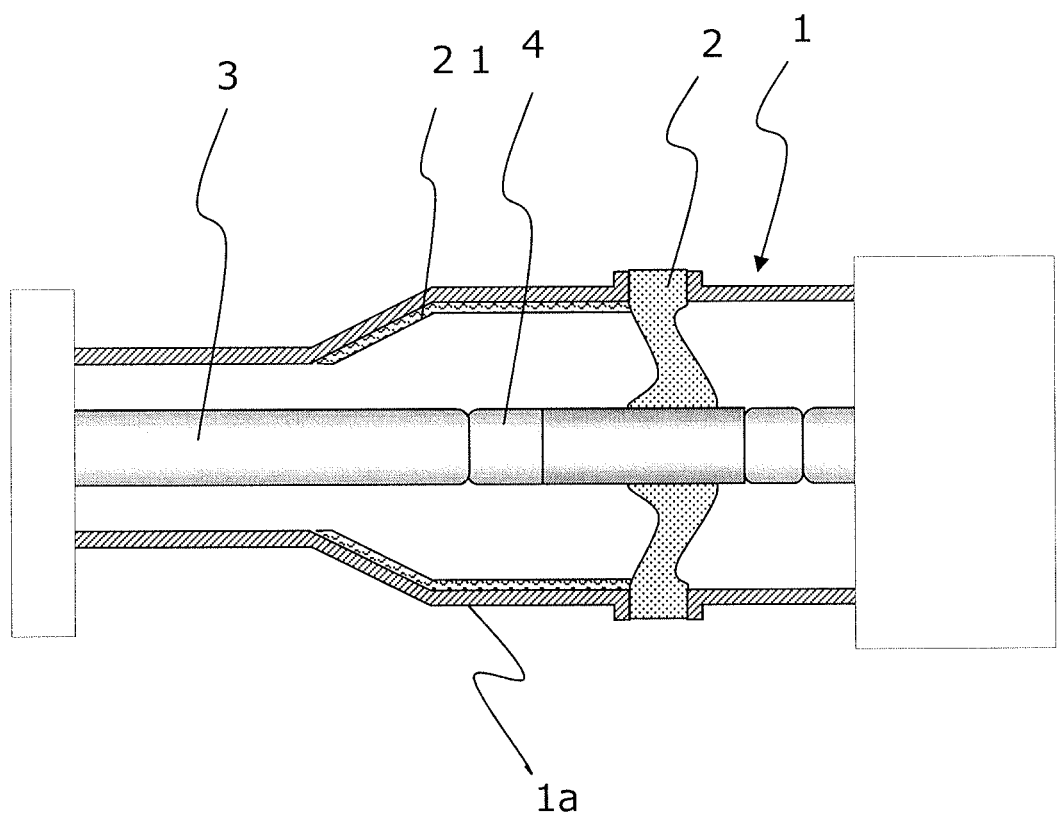
FIG. 6 is a cross-sectional view showing a configuration of essential components of a gas insulated bus according to another embodiment of the present invention.
Figure 7:
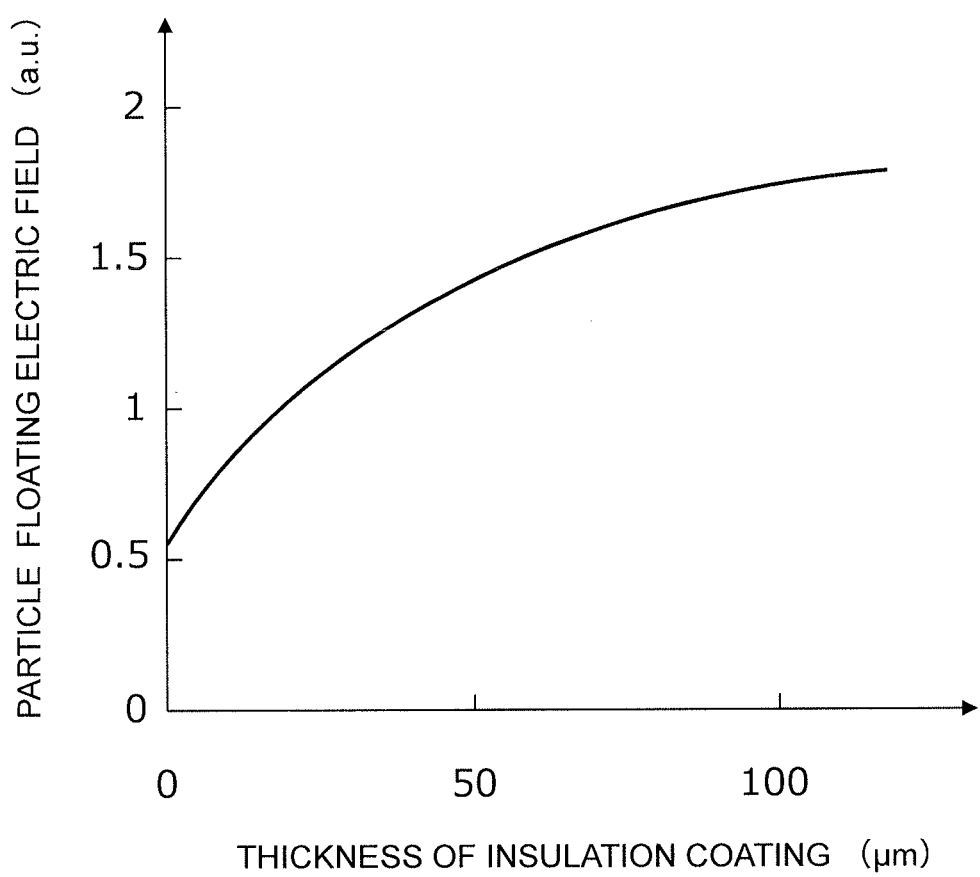
FIG. 7 is a graph showing the relationship between a thickness of an insulation coating in a metal container and a particle floating electric field.

The embodiment in FIG. 1 is characterized in that the expanded diameter part 1a is formed in a part of the metal container 1 located near the insulating spacer 2 so that particles are collected in the expanded diameter part 1a during conditioning for a particle. The present embodiment shown in FIG. 6 is characterized in that the inner surface of the expanded diameter part 1a of the metal container 1 in the embodiment in FIG. 1 is covered with an insulation coating 21. That is, as shown in FIG. 7, when the inner surface of the expanded diameter part 1a is covered with the insulation coating 21, the particle floating electric field $E_L$ increases consistently with the thickness of the insulation coating 21. Since the increased particle floating electric field $E_L$ makes a particle unlikely to refloat, the present embodiment prevents the particle trapped in the expanded diameter part 1a from refloating, and allows the particle to reliably remain in the expanded diameter part 1a, which is a particle trap. As a result, a reliable particle trap can be implemented which does not affect the insulation performance even when the particle having moved to the expanded diameter part 1a is left uncontrolled.

Not only the inner surface of the expanded diameter part 1a of the metal container 1 but also the inner surface of the reduced diameter part 1b may be covered with an insulation coating 21. In this case, the insulation coating 21 over the expanded diameter part 1a is preferably thicker than that over the reduced diameter part 1b. This allows a particle having temporarily moved to the expanded diameter part 1a to be prevented from refloating. When not only the inner diameter of the metal container 1 is varied but also the thickness of the insulation coating over the inner surface of the metal container 1 is controlled, as described above, a more reliable gas insulated bus can be provided. Furthermore, the present embodiment can further improve the insulation performance of the reduced diameter part 1b, enabling a further reduction in the diameter of the reduced diameter part 1b and thus in the size of the gas insulated bus.

Embodiment 5

Figure 8:
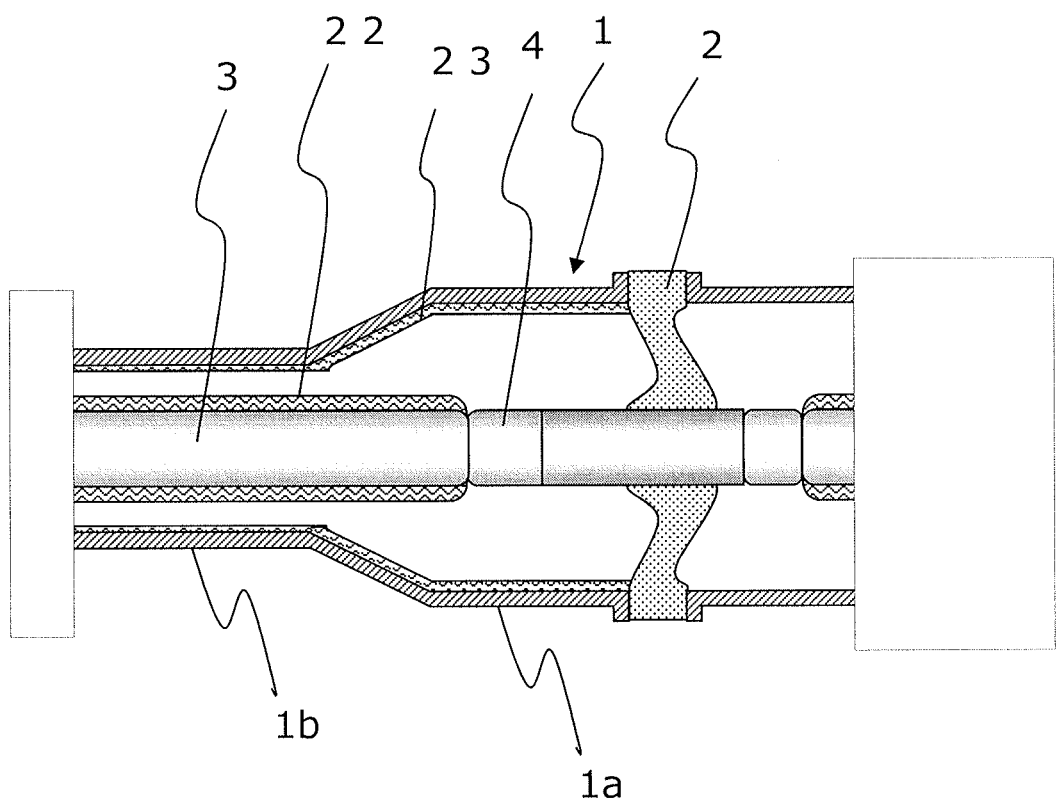
FIG. 8 is a cross-sectional view showing a configuration of essential components of a gas insulated bus according to yet another embodiment of the present invention.
Figure 9:
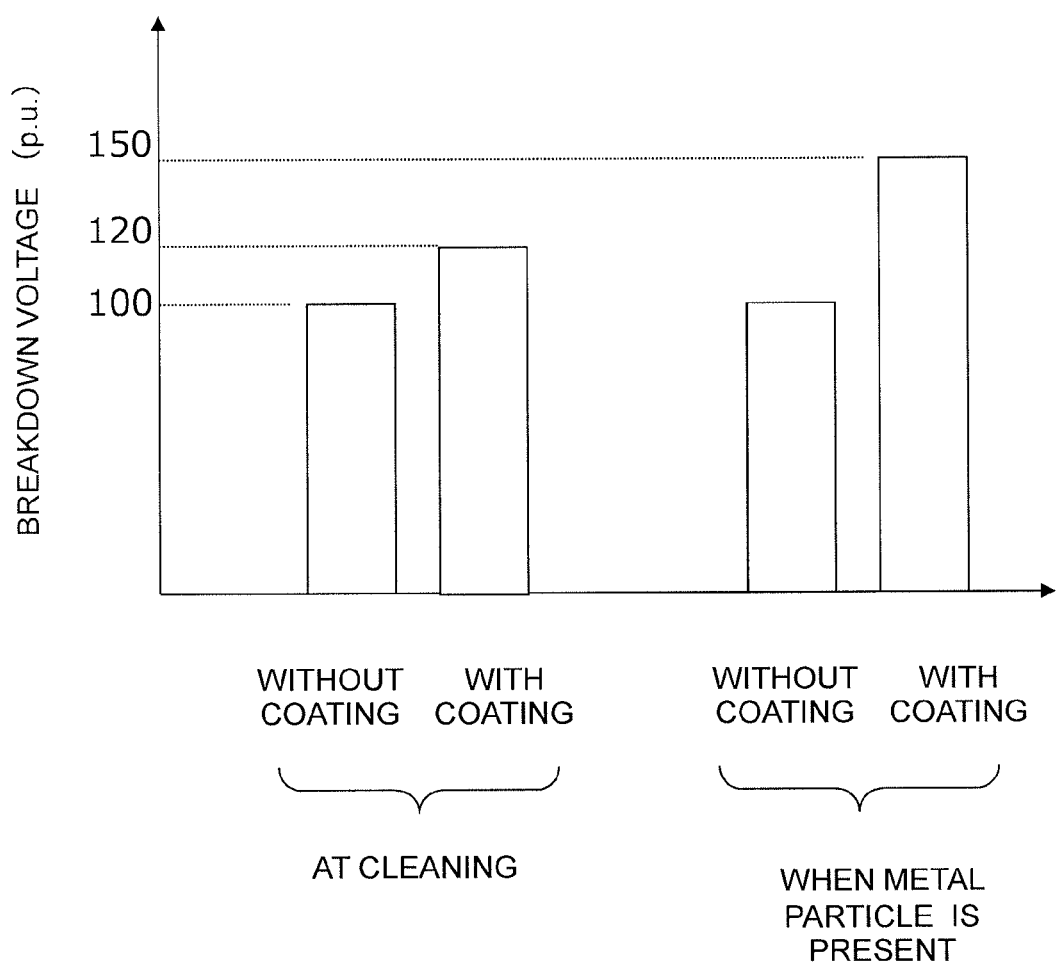
FIG. 9 is a diagram illustrating a variation in breakdown voltage depending on whether or not an insulation coating is present.

FIG. 8 shows a cross-sectional configuration of essential parts of a gas insulated bus according to the present embodiment. The present embodiment is different from the embodiment in FIG. 1 in that an insulation coating 22 is provided over the high-voltage conductor 3 in the reduced diameter part 1b and that an insulation coating 23 is formed all over the inner surface of the metal container 1. FIG. 9 shows a variation in breakdown voltage depending on whether or not the insulation coating 22 over the high-voltage conductor 3 in the reduced diameter part 1b is present and whether the metal container 1 contains no metal particle and is thus clean or contains any particle.

As seen in FIG. 9, according to the present embodiment, the high-voltage conductor 3 is provided with the insulation coating 22. Thus, the breakdown voltage and thus the insulation performance can be increased. Furthermore, the application of the insulation coating 22 improves the withstand voltage with respect to a particle and thus enables conditioning for a particle to be achieved at a higher applied voltage. For example, in the conventional art, if the high-voltage conductor 3 is not provided with the insulation coating 22, there is a possibility that insulation breakdown occurs during conditioning for a particle. However, if the withstand voltage is prevented from decreasing repeatedly during voltage reapplication in spite of insulation breakdown in the reduced diameter part 1b, the insulation breakdown during the conditioning for a particle may be tolerable. However, definitely determining where insulation breakdown is occurring is difficult. Hence, possible insulation breakdown is desirably prevented.

In this regard, if the high-voltage conductor 3 is provided with the insulation coating 22 as in the present embodiment, the withstand voltage performance is improved, and insulation breakdown is suppressed up to a higher applied voltage. This enables conditioning for a particle to be achieved at a higher applied voltage. Expression (2) indicates that the particle floating electric field does not depend on the length of the particle. However, in actuality, a longer particle deviates more markedly from the ideal linear state and is more significantly deformed, and a shorter particle adheres more tightly to a bottom surface. Thus, a higher applied voltage enables even a short particle to be reliably subjected to the conditioning for a particle. Furthermore, in FIG. 8, only the high-voltage conductor 3 in the reduced diameter part 1b is provided with the insulation coating. However, for the conditioning for a particle, similar effects are exerted by providing the high-voltage conductor 3 and the connection conductor 4 in the expanded diameter part 1a with an insulation coating.

The present invention has been described based on the embodiments. For a reduction in the cost and weight of the gas insulated bus, the diameter of the metal container needs to be further reduced. Determining factors for the size of the gas insulated bus include insulation performance and conductivity performance. The gas insulated bus is desired to satisfy both insulation and conductivity performance requirements and to have a further reduced size and further improved reliability. For the conductivity performance, according to the provisions in the JEC standard, the silver-contact conductor connection part needs to have an conduction temperature of at most 115° C., whereas the insulating spacer part needs to have an conduction temperature of at most 105° C. In terms of a rise in temperature, the insulating spacer part needs to demonstrate higher performance.

In this connection, it is ideal to form the expanded diameter part of the metal container, which has a large diameter, near the insulating spacer, while forming the reduced diameter part of the metal container, which has a small diameter, in an area away from the insulating spacer. That is, the expanded diameter part of the metal container, which has a large diameter, has an increased heat radiation area, serving to prevent a rise in temperature. Furthermore, heat is more likely to be released when the high-voltage conductor located near the insulating spacer is not provided with an insulation coating as in the embodiment shown in FIG. 8. In this manner, the conductivity performance requirement can be satisfied with an increase in temperature suppressed even when the diameter of the metal container is reduced except for the vicinity of the insulating spacer.

Additionally, as described above, insulation coating only in the high-voltage conductor in the reduced diameter part is sufficient for the conditioning for a particle. Thus, the size of the gas insulated bus can be reduced with the insulation and conductivity performance requirements satisfied.

REFERENCE SIGNS LIST

1 Metal container
1a Expanded diameter part
1b Reduced diameter part
1c Transition part
2 Insulating spacer
3 High-voltage conductor
4 Connection conductor
5 Flange
9 Hand hole
10 Gas insulated bus
11a, 11b Cradles
12 Metal container for applied voltage
13 Bushing for applied voltage
14 Seal cap
21, 22 Insulation coating

What is claimed is:

1. A gas insulated bus comprising a conductor supported in a cylindrical metal container via an insulator, insulating gas being contained in the metal container, wherein the metal container comprises an expanded diameter part formed over a given range in an area of the metal container in which the insulator is positioned and a reduced diameter part formed over an entire area of the metal container except for the expanded diameter part;
wherein an inner surface of at least the expanded diameter part of the metal container is covered with an insulating coating, and
wherein a surface of the conductor corresponding to a position opposite to at least the reduced diameter part of the metal container is covered with an insulation coating.

2. A gas insulated bus comprising a conductor supported in a cylindrical metal container via an insulator, insulating gas being contained in the metal container, wherein the metal container comprises an expanded diameter part formed over a given range in an area of the metal container in which the insulator is positioned and a reduced diameter part formed over an entire area of the metal container except for the expanded diameter part and, wherein an opening with a releasable cover is formed in the expanded diameter part of the metal container at least on one side of the insulator.

3. A particle removal method for removing a particle having entered the metal container of a gas insulated bus comprising:
coupling a metal container for applied voltage comprising a line for applied voltage for applying a voltage to the conductor of the gas insulated bus, to a flange on one end of the metal container of the gas insulated bus formed at respective opposite ends of the metal container and which is coupled to a metal container of another gas insulated bus, and coupling a testing seal container to a flange on the other end;

installing the metal container at least in an inclined manner and containing insulating gas in the respective containers; and applying a voltage to the conductor in a stepwise fashion via the metal container for applied voltage to allow a particle present in the metal container of the gas insulated bus to float and accumulate to collect the particle in the expanded diameter part located at a low position of the inclined metal container, wherein said gas insulated bus comprises a conductor supported in a cylindrical metal container via an insulator, insulating gas being contained in the metal container, wherein the metal container comprises an expanded diameter part formed over a given range in an area of the metal container in which the insulator is positioned and a reduced diameter part formed over an entire area of the metal container except of the expanded diameter part.

* * * * *